United States Patent
Pan et al.

(10) Patent No.: US 10,754,201 B2
(45) Date of Patent: Aug. 25, 2020

(54) LIQUID CRYSTAL PHOTOELECTRIC APPARATUS AND MANUFACTURING METHOD OF LIQUID CRYSTAL PHOTOELECTRIC APPARATUS

(71) Applicants: National Tsing Hua University, Hsinchu (TW); Advanced Comm. Engineering Solution Co., Ltd., Hsinchu County (TW)

(72) Inventors: Ci-Ling Pan, Hsinchu (TW); Anup Kumar Sahoo, Hsinchu (TW); Chun-Ling Yen, Hsinchu (TW); Chan-Shan Yang, Taipei (TW); Yi-Hsin Lin, Hsinchu (TW); Hung-Chun Lin, Hsinchu (TW); Yu-Jen Wang, Hsinchu (TW)

(73) Assignees: National Tsing Hua University, Hsinchu (TW); Advanced Comm. Engineering Solution Co., Ltd., Hsinchu County (TW)

( * ) Notice: Subject to any disclaimer, the term of this patent is extended or adjusted under 35 U.S.C. 154(b) by 0 days.

(21) Appl. No.: 16/167,544

(22) Filed: Oct. 23, 2018

(65) Prior Publication Data

US 2020/0073179 A1   Mar. 5, 2020

(30) Foreign Application Priority Data

Aug. 28, 2018  (TW) .............................. 107130024 A

(51) Int. Cl.
G02F 1/1337   (2006.01)
G02F 1/1339   (2006.01)
G02F 1/1347   (2006.01)

(52) U.S. Cl.
CPC ...... *G02F 1/133711* (2013.01); *G02F 1/1337* (2013.01); *G02F 1/1339* (2013.01); *G02F 1/13471* (2013.01)

(58) Field of Classification Search
CPC ............. G02F 1/133711; G02F 1/1339; G02F 1/1337; G02F 1/13378; G02F 1/133707;
(Continued)

(56) References Cited

U.S. PATENT DOCUMENTS 5,875,012 A * 2/1999 Crawford ............ G02F 1/13473
349/74
6,317,189 B1 * 11/2001 Yuan ................... G02F 1/13342
349/176
(Continued)

FOREIGN PATENT DOCUMENTS

CN     105929618        9/2016
TW     200925724        6/2009
TW     200925724 A   *  6/2009

OTHER PUBLICATIONS

English translation of TW200925724A, Title:Double super twisted nematic liquid crystal diplay panel and compensation method of color discrepancy of flat display panel, Author: Weng Hao-Chieh; Tsai Yi-Ru; Date of publication: Jun. 16, 2009 (Year: 2009).*

(Continued)

*Primary Examiner* — Shan Liu
(74) *Attorney, Agent, or Firm* — JCIPRNET

(57) ABSTRACT

A liquid crystal photoelectric apparatus including an upper substrate, a lower substrate, a plurality of alignment layers, and a liquid crystal material is provided. The alignment layers include an upper alignment layer, a lower alignment layer, and at least one intermediate alignment layer. The upper alignment layer has a first orientation direction. The lower alignment layer has a second orientation direction. The at least one intermediate alignment layer has an inter-
(Continued)

mediate orientation direction. The intermediate orientation direction is between the first orientation direction and the second orientation direction. The liquid crystal material includes a plurality of liquid crystal material portions. Each of the liquid crystal material portions is disposed between any adjacent two alignment layers. A manufacturing method of the liquid crystal photoelectric apparatus is also provided.

6 Claims, 20 Drawing Sheets

(58) Field of Classification Search
CPC ......... G02F 1/133753; G02F 1/133784; G02F 1/3775; G02F 1/133719; G02F 1/0027; G02F 1/141; G02F 2001/133738; G02F 2001/133769; G02F 2001/133776; G02F 2001/13787; G02F 2001/133746; G02F 2001/133749; G02F 2001/133773; G02F 2001/3548; G02F 2001/133742; G02F 2001/133761; G09G 2300/0495; G09G 2300/0486; H01L 21/02211; H05K 3/389; C08F 259/08; C09K 2019/548
USPC .................................................. 349/123–136
See application file for complete search history.

(56) References Cited

U.S. PATENT DOCUMENTS

| | | | | |
|---|---|---|---|---|
| 6,485,798 | B1* | 11/2002 | Aminaka | C09K 19/0208 252/299.5 |
| 2002/0176041 | A1* | 11/2002 | Hisamitsu | G02F 1/13471 349/115 |
| 2003/0067572 | A1* | 4/2003 | Umeda | G02B 5/3083 349/117 |
| 2005/0140880 | A1* | 6/2005 | Lee | G02F 1/133632 349/117 |
| 2006/0092356 | A1* | 5/2006 | Morimoto | G02F 1/13363 349/114 |
| 2006/0187395 | A1* | 8/2006 | Yang | G02F 1/1395 349/130 |
| 2012/0092600 | A1* | 4/2012 | Kurosaki | G02F 1/133553 349/115 |
| 2014/0016080 | A1* | 1/2014 | Chen | G02F 1/29 349/200 |
| 2014/0036183 | A1* | 2/2014 | Asatryan | G02F 1/139 349/33 |
| 2015/0153595 | A1 | 6/2015 | Li et al. | |
| 2016/0377906 | A1* | 12/2016 | Feuillade | G02F 1/133711 349/194 |
| 2017/0371188 | A1* | 12/2017 | Chen | G02F 1/1337 |
| 2019/0025656 | A1* | 1/2019 | Hayashi | C09K 19/38 |

OTHER PUBLICATIONS

Anup Kumar Sahoo et al. "Liquid Crystal Based Terahertz Phase Shifter with Bi-Layer Structure," IRMMW-THz 2018, 2018 43rd International Conference on Infrared, Millimenter and Terahertz Waves, Sep. 9-14, 2018, pp. 1.

"Office Action of Taiwan Counterpart Application," dated Mar. 22, 2019, p. 1-p. 11.

* cited by examiner

LIQUID CRYSTAL PHOTOELECTRIC APPARATUS AND MANUFACTURING METHOD OF LIQUID CRYSTAL PHOTOELECTRIC APPARATUS

CROSS-REFERENCE TO RELATED APPLICATION

This application claims the priority benefit of Taiwan application serial no. 107130024, filed on Aug. 28, 2018. The entirety of the above-mentioned patent application is hereby incorporated by reference herein and made a part of this specification.

BACKGROUND

Technical Field

The invention relates to a liquid crystal photoelectric apparatus and a manufacturing method of the liquid crystal photoelectric apparatus. More particularly, the invention relates to a liquid crystal photoelectric apparatus used in a terahertz band and a manufacturing method of the liquid crystal photoelectric apparatus used in the terahertz band.

Description of Related Art

In the technical field, the research related to the terahertz band increases in recent years. As the terahertz band becomes more widely applied, demands for various types of photoelectric devices suited to the terahertz band, for example, imaging devices, modulators, phase retarders, or other terahertz optoelectronics devices, are on the increase. Particularly, applications and research related to the development of phase retarders are have attracted much attention.

The terahertz band liquid crystal cells are used mainly for phase retardation. The phase retardation capability of a liquid crystal cell is mainly determined by the thickness of the liquid crystal layer disposed in the liquid crystal cell. In order to achieve greater phase retardation, the thickness of the liquid crystal layer is required to be greater. Nevertheless, liquid crystal molecules in a thicker liquid crystal layer are disorderly arranged most of the time. The disorderly-arranged liquid crystal molecules lead to greater response time of the liquid crystal cell, and further, a grater driving voltage is also required to drive the liquid crystal cell. It thus can be seen that owing to the foregoing problem, applications of the liquid crystal cells in the related art are limited in the industry.

SUMMARY

The invention provides a liquid crystal photoelectric apparatus featuring favorable photoelectric properties and a reduced thickness and suited to light beams in a terahertz band.

The invention further provides a manufacturing method of manufacturing the liquid crystal photoelectric apparatus.

A liquid crystal photoelectric apparatus provided by an embodiment of the invention includes an upper substrate, a lower substrate, a plurality of alignment layers, and a liquid crystal material. The alignment layers include an upper alignment layer, at least one intermediate alignment layer, and a lower alignment layer. The liquid crystal material includes a plurality of liquid crystal material portions. The upper alignment layer is disposed between the upper substrate and the at least one intermediate alignment layer. The lower alignment layer is disposed between the lower substrate and the at least one intermediate alignment layer. The at least one intermediate alignment layer is disposed between the upper alignment layer and the lower alignment layer. The upper alignment layer has a first orientation direction. The lower alignment layer has a second orientation direction, and the intermediate alignment layer has an intermediate orientation direction. The intermediate orientation direction is between the first orientation direction and the second orientation direction. Each of the liquid crystal material portions is disposed between any adjacent two alignment layers.

A manufacturing method of manufacturing a liquid crystal photoelectric apparatus provided by an embodiment of the invention includes the following steps. An upper substrate and a lower substrate are prepared. A plurality of alignment layers are formed, and the alignment layers include an upper alignment layer, at least one intermediate alignment layer, and a lower alignment layer. The upper alignment layer and the lower alignment layer are respectively formed on the upper substrate and the lower substrate. The at least one intermediate alignment layer is disposed between the upper alignment layer and the lower alignment layer. The upper alignment layer has a first orientation direction, the lower alignment layer has a second orientation direction, and the intermediate alignment layer has an intermediate orientation direction. The intermediate orientation direction is between the first orientation direction and the second orientation direction. A liquid crystal material is provided. The liquid crystal material includes a plurality of liquid crystal material portions, and each of the liquid crystal material portions is disposed between any adjacent two alignment layers.

To sum up, in the embodiments of the invention, since the intermediate alignment layer is disposed, and the orientation directions of the upper alignment layer, the lower alignment layer, and the intermediate alignment layer are correspondingly designed, the liquid crystal molecules of the liquid crystal material are arranged in a more orderly manner. Therefore, the liquid crystal photoelectric apparatus features favorable photoelectric properties and the reduced thickness and may be applied to light beams in different terahertz bands.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
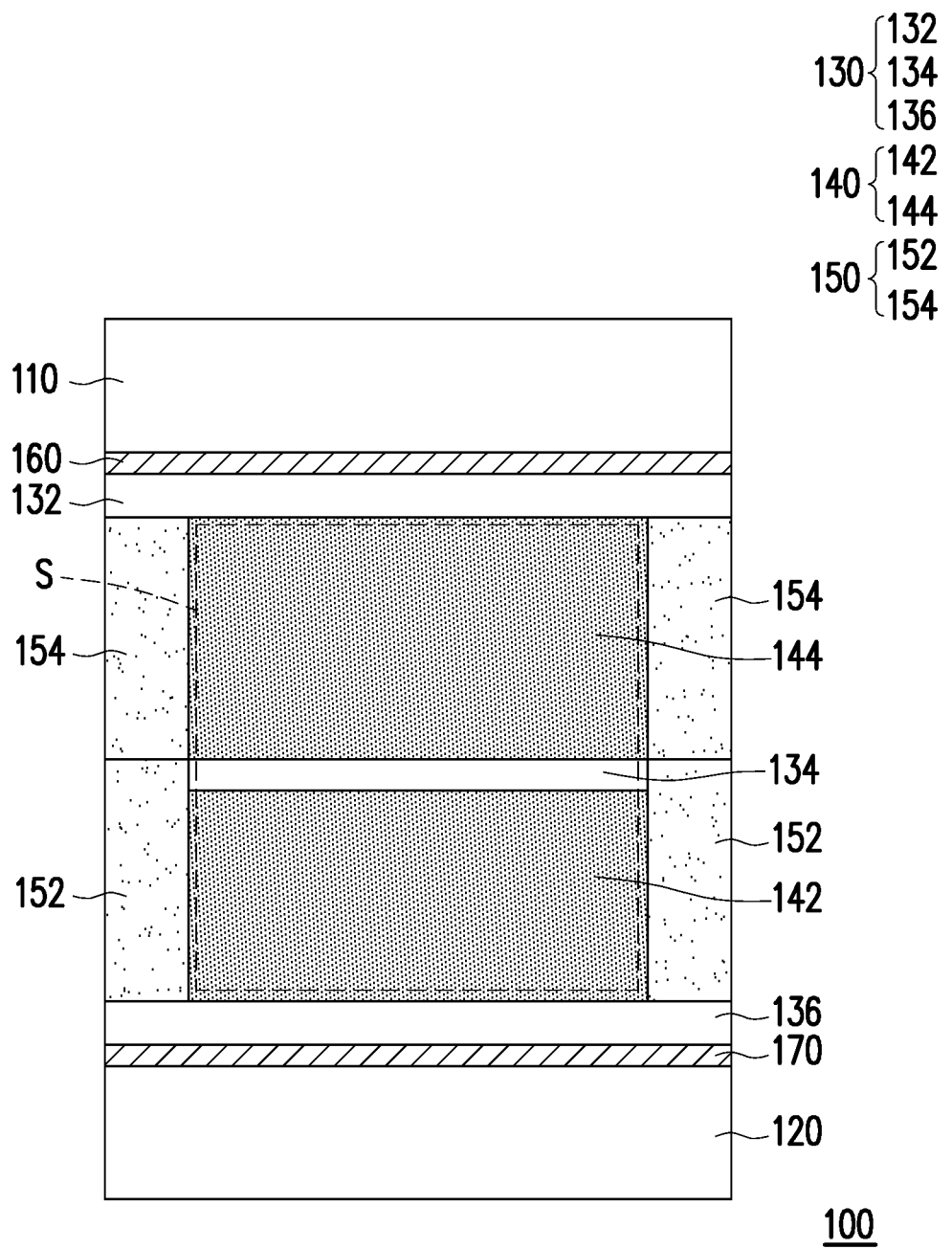
FIG. 1A is a schematic cross-sectional view of a liquid crystal photoelectric apparatus according to an embodiment of the invention.
Figure 1B:
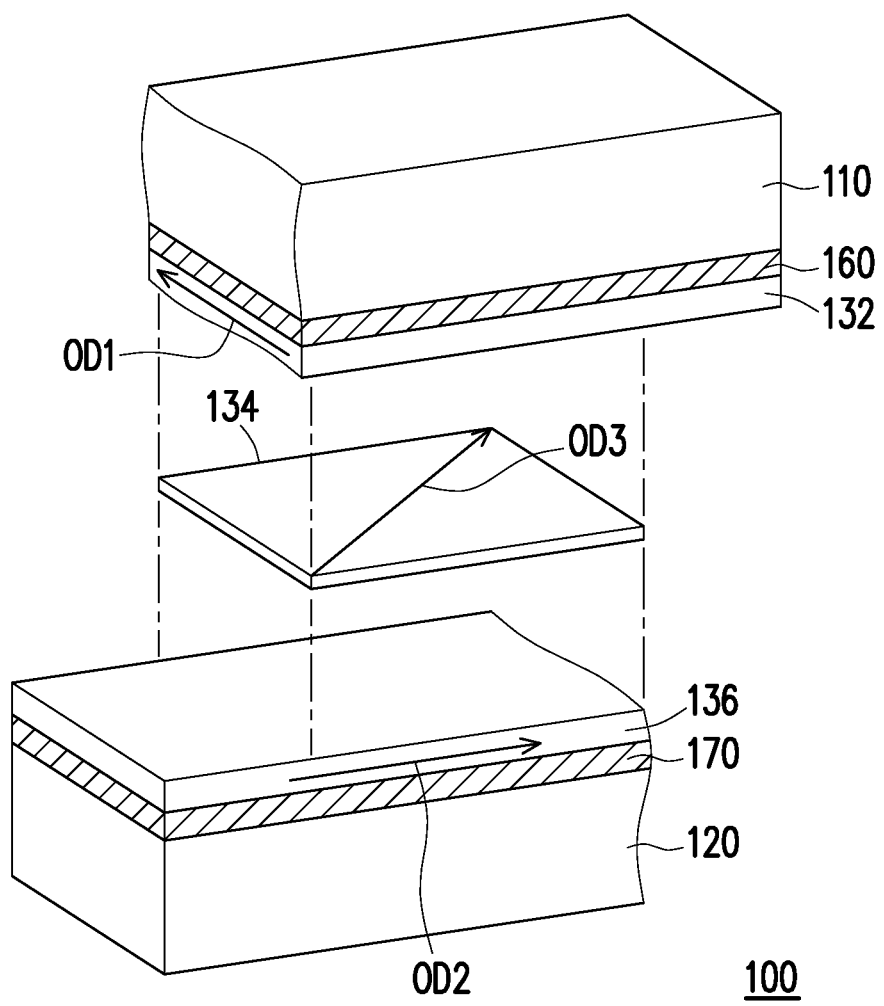
FIG. 1B is a schematic exploded oblique view of FIG. 1A according to an embodiment of the invention.

FIG. 1A is a schematic cross-sectional view of a liquid crystal photoelectric apparatus according to an embodiment of the invention. FIG. 1B is a schematic exploded oblique view of FIG. 1A according to an embodiment of the invention. For clarity, a liquid crystal material, a spacer, a portion of an upper substrate, a portion of a lower substrate, and a portion of a transparent conductive layer are omitted in FIG. 1B. In addition, to simplify description, a structure of an intermediate alignment layer 134 is specifically shown in FIG. 2E, FIG. 2F, and FIG. 2H and is shown in a simplified manner in the rest of the drawings.

With reference to FIG. 1A and FIG. 1B, in this embodiment, a liquid crystal photoelectric apparatus 100 is embodied as a liquid crystal cell featuring a phase retardation function and thus may be treated as a liquid crystal phase retarder. The liquid crystal photoelectric apparatus 100 includes an upper substrate 110, a lower substrate 120, a plurality of alignment layers 130, a liquid crystal material 140, a spacer 150, a transparent conductive layer 160, and a transparent conductive layer 170. In this embodiment, the liquid crystal photoelectric apparatus 100 is suited to a light beam with a wave length ranges in a terahertz band and, for example, is used for terahertz band phase retardation or is used to adjust other light field parameters. The foregoing devices are described in detail in the following paragraphs.

The upper substrate 110 and the lower substrate 120 are configured to act as supports of each of the other elements inside the liquid crystal photoelectric apparatus 100. In this embodiment, the upper substrate 110 and the lower substrate 120 are, for example, translucent substrates allowing the terahertz band to penetrate through. The translucent substrates preferably are, for example, quartz glass substrates, but not limited thereto. A thickness of the upper substrate 110 and a thickness of the lower substrate 120 are both 1 millimeter (mm), for example, but are not limited in this regard.

The alignment layers 130 are mainly used to control an arrangement manner of or an angle of liquid crystal molecules in the liquid crystal material 140. The alignment layers 130 include an upper alignment layer 132, at least one intermediate alignment layer 134, and a lower alignment layer 136. The word "intermediate" refers to being located between the upper alignment layer 132 and the lower alignment layer 136. In this embodiment, the number of the at least one intermediate alignment layer 134 is, for example, one, but is not limited in this regard. Specifically, a material of the upper alignment layer 132 and a material of the lower alignment layer 136 are, for example, polymer materials such as polyimide (PI, hereinafter referred to as PI). In addition, the intermediate alignment layer 134 is schematically shown in FIG. 1A and FIG. 1B, and a specific structure of the intermediate alignment layer 134 is shown in FIG. 2H. With reference to FIG. 2H, a material of the intermediate alignment layer 134, for example, includes liquid crystal materials 1342 and liquid polymers 1344. The liquid crystal materials 1342 are, for example, nematic liquid crystal (NLC, a product of Merck, for example, with a model number of MLC 2070). The liquid polymers 1344 are, for example, photosensitive liquid polymers and are formed by, for example, a photosensitizer (e.g., a photoinitiator, a product of Merck, for example, with a model number of IRG-184) and reactive mesogen (a product of Merck, for example, with a model number of RM 257).

The liquid crystal material 140, for example, may also be nematic liquid crystal.

The spacer 150 is configured to fix a cell gap between the upper substrate 110 and the lower substrate 120, as such, a thickness of the liquid crystal material 140 disposed between the upper substrate 110 and the lower substrate 120 is maintained to be uniform. In this embodiment, a thickness of the overall spacer 150 is, for example, 550 microns, and a thickness of anyone of a spacing portion 152 and a spacing portion 154 of the spacer 150 is, for example, 250 microns but is not limited thereto.

A material of the transparent conductive layer 160 and a material of the transparent conductive layer 170 may be transparent conductive polymer materials and may be poly (3,4-ethylenedioxythiophene)-polystyrene sulfonate (PEDOT:PSS, hereinafter referred to as PEDOT:PSS), which is not limited by the invention in this regard. In one embodiment, the material of the transparent conductive layer 160 and the material of the transparent conductive layer 170 may be transparent conductive inorganic substances, such as indium tin oxide (ITO), and may selectively feature a nanostructure, which is not limited by the invention. In another embodiment, the material of the transparent conductive layer 160 and the material of the transparent conductive layer 170 may be graphene, which is not limited by the invention in this regard. The liquid crystal photoelectric apparatus 100 may be coupled to an external power source (not shown) through the transparent conductive layer 160 and the transparent conductive layer 170, as such, an electric field is formed between the transparent conductive layer 160 and the transparent conductive layer 170, so that the arrangement manner of the liquid crystal molecules in the liquid crystal material 140 is controlled.

FIG. 2A to FIG. 2K are diagrams of a manufacturing method of manufacturing the liquid crystal photoelectric apparatus 100 of FIG. 1A and FIG. 1B.

Figure 2A:
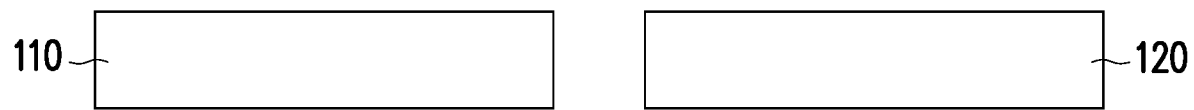
FIG. 2A to FIG. 2K are diagrams of a manufacturing method of manufacturing the liquid crystal photoelectric apparatus of FIG. 1A and FIG. 1B.

With reference to FIG. 2A, the upper substrate 110 and the lower substrate 120 are provided. The two substrates 110 and 120 are cleaned and dried to remove metal ions, organic molecules, natural oxidation layers, or dust attached thereon, so that preparation of the upper substrate 110 and the lower substrate 120 is completed.

Figure 2B:
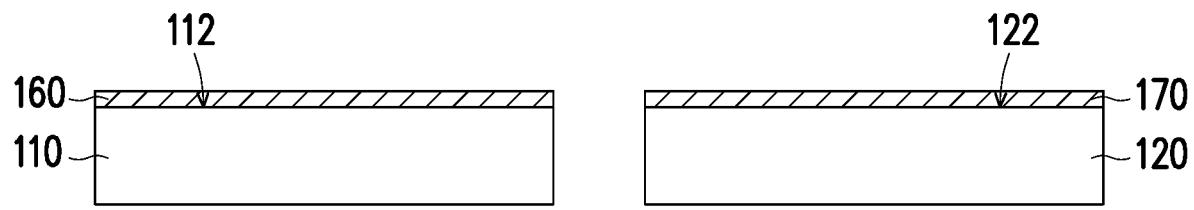

With reference to FIG. 2B, the transparent conductive layer 160 and the transparent conductive layer 170 are formed respective on a surface 112 of the upper substrate 110 and a surface 122 of the lower substrate 120. Specifically, a liquid type transparent conductive polymer material (e.g., PEDOT:PSS) is dropped on the surface 112 and the surface 122 in an appropriate amount and is heated and baked at an appropriate temperature through a solution method (which may be a spin coating method or a dip coating method), and then the transparent conductive layer 160 and the transparent conductive layer 170 are formed on the surface 112 and the surface 122. Herein, the amount of the liquid type transparent conductive polymer or a rotating speed may determine thicknesses of the transparent conductive layer 160 and the transparent conductive layer 170. In other embodiments, the transparent conductive layer 160 and the transparent conductive layer 170 may also be formed through an evaporating method, but are not limited thereto.

The upper alignment layer 132, the lower alignment layer 136, and the at least one intermediate alignment layer 134 in the alignment layers 130 are formed in sequence. The upper alignment layer 132 and the lower alignment layer 136 are formed through a same manner, but the intermediate alignment layer 134 is formed through a different manner. Description of the manners is provided in the following paragraphs.

The manner used to form the upper alignment layer 132 and the lower alignment layer 136 is described first.

Figure 2C:
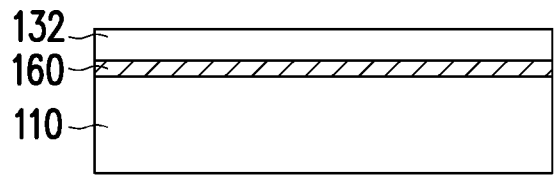
Figure 2C:
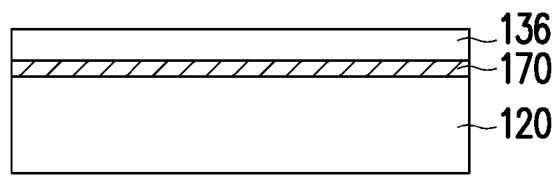

With reference to FIG. 2C, two polymer films are separately formed on the upper substrate 110 and the lower substrate 120. Specifically, a liquid type polymer material (e.g., PI) is dropped on the transparent conductive layer 160 and the transparent conductive layer 170 in an appropriate amount, and then the polymer films are formed through the above-mentioned solution method. Next, a piece of roller flannelette (not shown) is used to perform rubbing on surfaces of the two polymer films in a rubbing direction RD1 (marked as ⊙) and in a rubbing direction RD2 (marked as →). The two rubbing directions, for example, are perpendicular to each other, and people having ordinary skill in the art may make adjustment according to needs, and the two rubbing directions are not limited in this regard. So far, the step of manufacturing the upper alignment layer 132 and the lower alignment layer 136 is completed.

Figure 3:
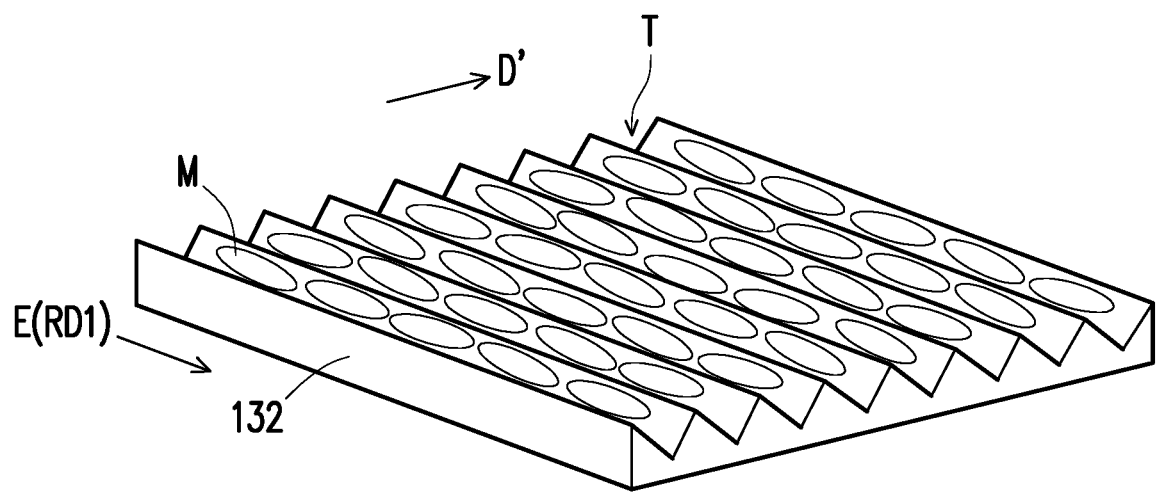
FIG. 3 is a schematic diagram of an arrangement manner of liquid crystal molecules near an alignment layer on the alignment layer.

With reference to FIG. 3, the upper alignment layer 132 is taken as an example. After the rubbing process is performed, a plurality of trenches T extending in an extending direction E (identical to the rubbing direction RD1) are formed on the surface of the polymer film. A major axis of liquid crystal molecules M close to the trenches T are disposed in the extending direction E of the trenches T owing to a force (i.e., anchoring energy) provided between the upper alignment layer 132 and the liquid crystal molecules M. The liquid crystal molecules M are arranged in a direction D', so that an arrangement manner or a pre-tilt angle of the liquid crystal molecules M is controlled. The extending direction E of the trenches T, for example, is called as an orientation direction OD1 of the upper alignment layer 132. In short, the rubbing direction applied in the rubbing process determines orientation directions corresponding to the alignment layers.

Next, the manner of forming the intermediate alignment layer 134 is described as follows.

Figure 2D:
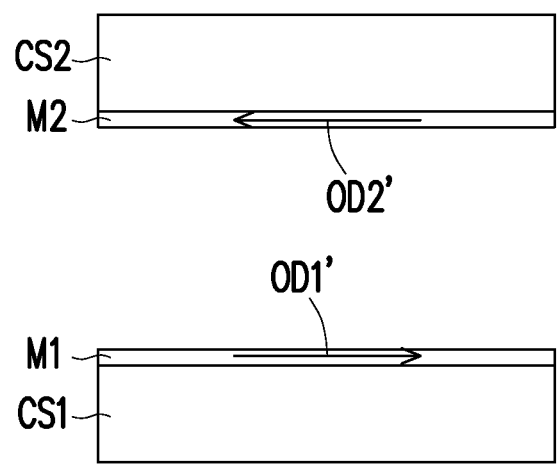

With reference to FIG. 2D, a transfer substrate CS1 provided with an alignment layer M1 and a transfer substrate CS2 provided with an alignment layer M2 are prepared. An orientation direction OD1' of the alignment layer M1 and an orientation direction OD2' of the alignment layer M2 are anti-parallel to each other. Materials and manufacturing manners of the transfer substrate CS1 and the transfer substrate CS2 and the alignment layer M1 and the alignment layer M2 are substantially similar to the manufacturing manners of the upper substrate 110 and the lower substrate 120 and the upper alignment layer 132 and the lower alignment layer 136, and a difference there between is the relationship between the orientation directions of the alignment layer M1 and the alignment layer M2 and thus is not described hereinafter.

Figure 2E:
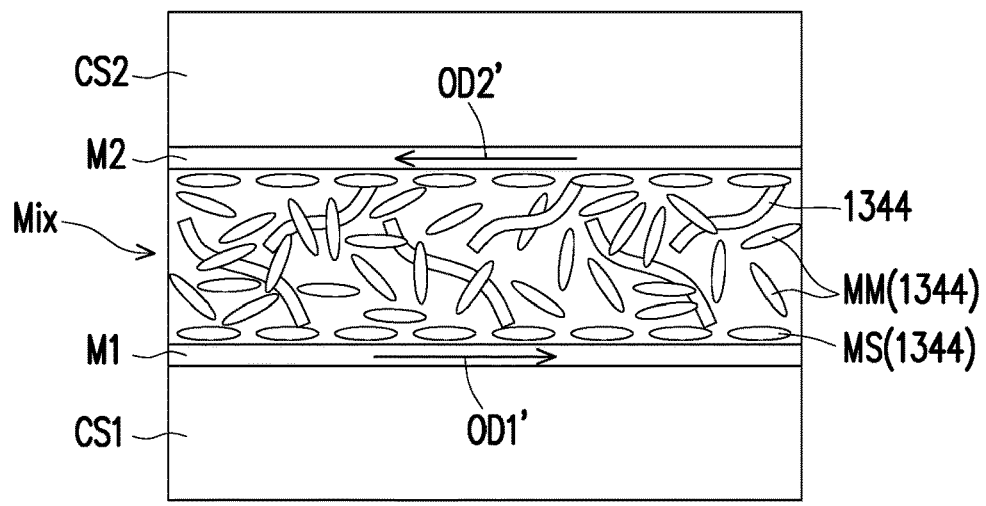

With reference to FIG. 2E, the liquid crystal materials 1342 and the liquid polymers 1344 are provided, and the liquid crystal materials 1342 and the liquid polymers 1344 are mixed between the alignment layer M1 and the alignment layer M2 to form a mixture Mix.

Figure 2F:
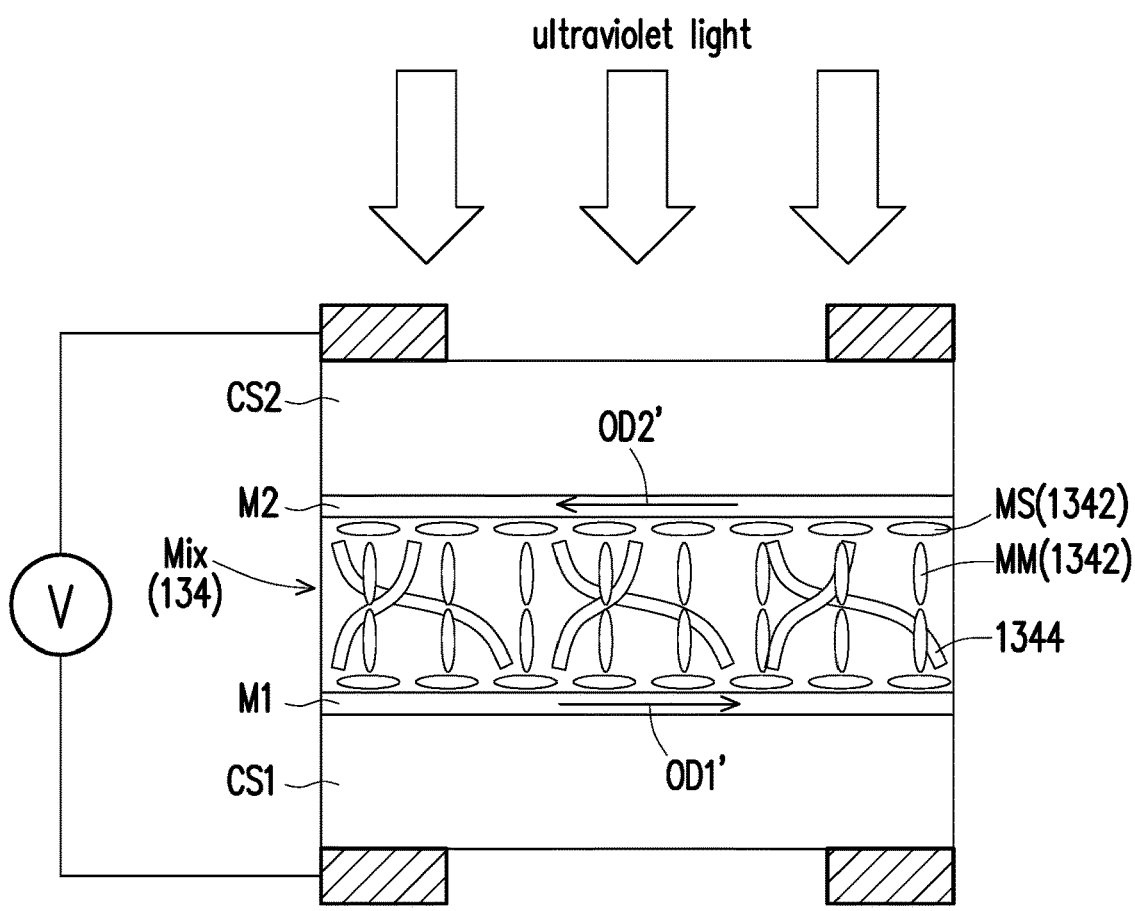

With reference to FIG. 2F, a curing treatment is performed on the mixture Mix to form the intermediate alignment layer 134 between the alignment layer M1 and the alignment layer M2. In this embodiment, the curing treatment is, for example, an ultraviolet light irradiation treatment, and irradiation time may be 40 minutes to 60 minutes, preferably 1 hour. Intensity of the ultraviolet light may be 1 mW/cm$^2$ to 5 mW/cm$^2$, preferably 3 mW/cm$^2$, and people having ordinary skill in the art may appropriately adjust the irradiation intensity and time according to needs. Chain scission may be performed on molecules of the liquid polymers 1344 through the ultraviolet light irradiation treatment so that a curing reaction may be performed between the liquid crystal materials 1342 and the liquid polymers 1344.

With reference to FIG. 2F, according to different positions of the liquid crystal materials 1342, the liquid crystal materials 1342 include liquid crystal molecules MS closer to a surface of the mixture Mix and liquid crystal molecules MM located in the middle of the mixture Mix. In order to prevent deflection of light beams from being affected by the liquid crystal molecule MM located in the middle of the mixture Mix in the following process, in the process of curing the mixture Mix, an external power source V may preferably be connected to apply a voltage on the mixture Mix at the same time. Hence, the liquid crystal molecules MM are affected by an electric field and are arranged in a direction parallel to the electric field, and that the arrangement manner of the liquid crystal molecules MM is fixed owing to a curing effect. Nevertheless, the arrangement manner of the liquid crystal molecules MS close to the surface of the mixture Mix is determined by the orientation direction OD1' and the orientation direction OD2' of the alignment layer M1 and the alignment layer M2 and thus is less susceptible to be affected by the electric field. Hence, the voltage is simultaneously applied in the curing treatment to manufacture the intermediate alignment layer 134, so that the light beams are less susceptible to be affected by the liquid crystal molecules MM located in the middle of the mixture Mix. In this embodiment, the voltage may range from 300 $V_{rms}$ to 500 $V_{rms}$, and preferably 350 $V_{rms}$, and a frequency of the voltage may be 1 kHz. People having ordinary skill in the art may appropriately adjust the voltage and the frequency of the voltage according to needs. The $V_{rms}$ refers to a root-mean-square value of an applied alternating-current voltage.

Figure 2G:
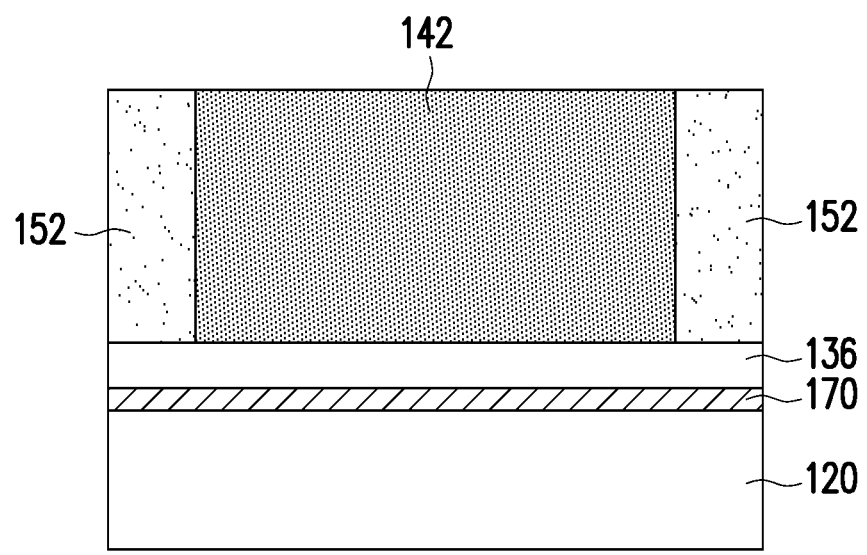
Figure 2H:
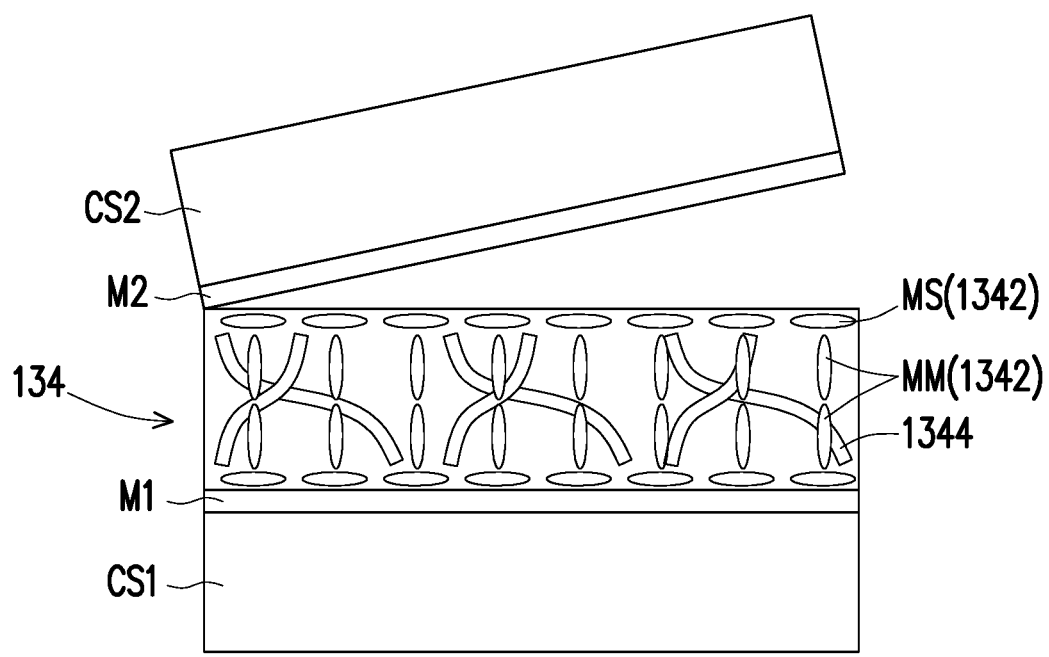

With reference to FIG. 2G, the spacing portion 152 of the spacer 150 is provided and is disposed on the lower alignment layer 136. Further, a liquid crystal material portion 142 of the liquid crystal material 140 is disposed between the spacing portion 152 and the lower alignment layer 136.

With reference to FIG. 2H, the alignment layer M2 and the transfer substrate CS2 are peeled off through a heating process.

Figure 2I:
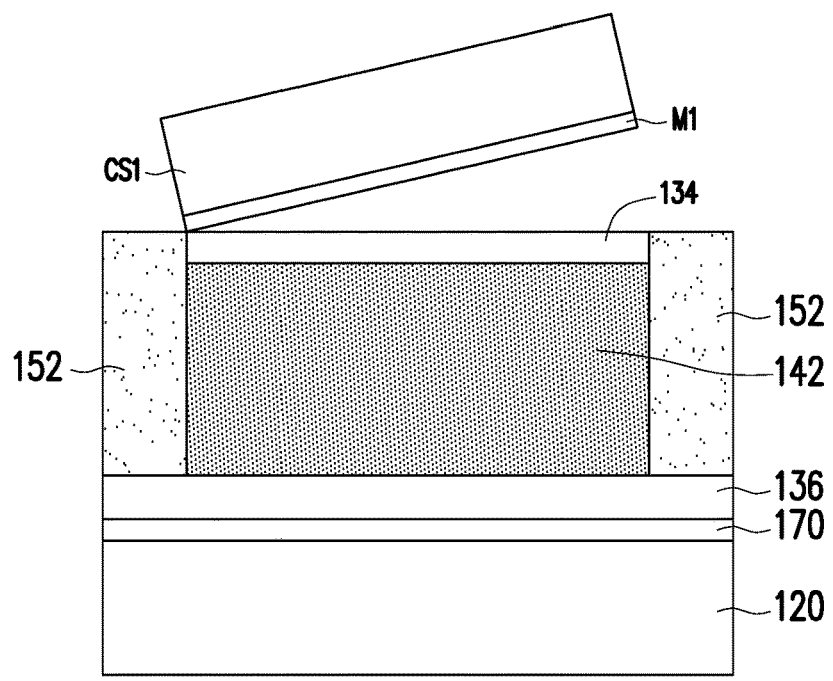

With reference to FIG. 2I, the transfer substrate CS1 is placed upside down on the liquid crystal material portion 142, so that the intermediate alignment layer 134 is disposed on the liquid crystal material portion 142. At the same time, the alignment layer M1 and the transfer substrate CS1 are peeled off through the heating process.

Figure 2J:
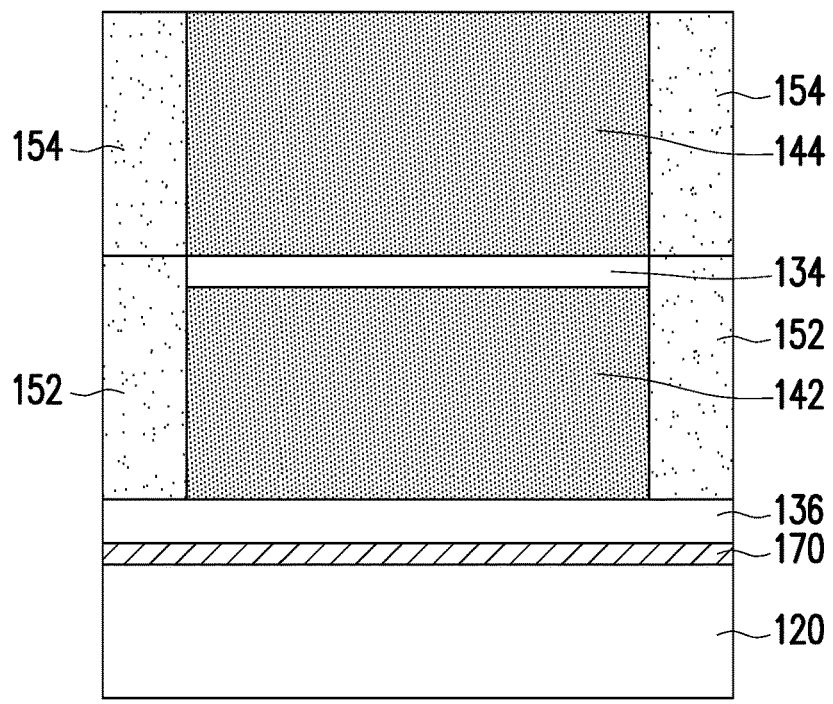

With reference to FIG. 2J, the spacing portion 154 of the spacer 150 is further provided and is disposed on the intermediate alignment layer 134, and the liquid crystal material portion 144 of the liquid crystal material 140 is disposed among the spacing portion 154 and the intermediate alignment layer 134.

Figure 2K:
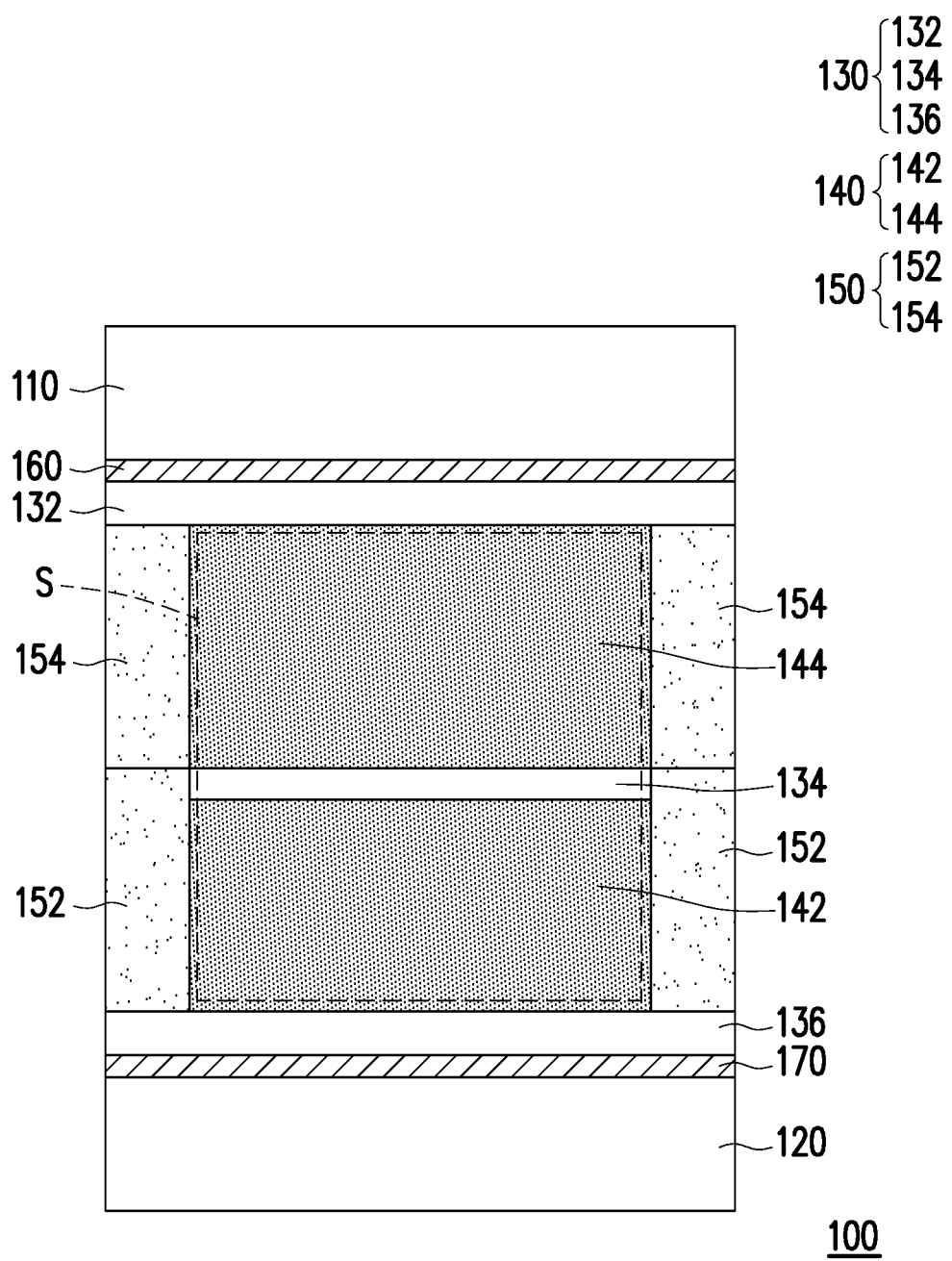

With reference to FIG. 2K, the upper substrate 110 on which the upper alignment layer 132 is formed is transposed onto the liquid crystal material portion 144, so that the intermediate alignment layer 134 is disposed between the upper alignment layer 132 and the lower alignment layer 136. Each of the liquid crystal material portions 142 and 144 of the liquid crystal material 140 is disposed between any adjacent two alignment layers 130. So far, manufacturing of the liquid crystal photoelectric apparatus 100 is substantially completed.

The arrangement manner of the foregoing devices is described in detail in the following paragraphs.

With reference to FIG. 1A, in the liquid crystal photoelectric apparatus 100 of this embodiment, the upper substrate 110 and the lower substrate 120 are disposed opposite to each other. The upper alignment layer 132 is disposed between the upper substrate 110 and the intermediate alignment layer 134. The intermediate alignment layer 134 is disposed between the upper alignment layer 132 and the lower alignment layer 136. The lower alignment layer 136 is disposed between the intermediate alignment layer 134 and the lower substrate 120. The liquid crystal material 140 is disposed between any adjacent two alignment layers 130 in the alignment layers 130. That is, the liquid crystal material 140 is disposed between the upper alignment layer 132 and the intermediate alignment layer 134, and the liquid crystal material 140 is also disposed between the intermediate alignment layer 134 and the lower alignment layer 136. The spacer 150 is disposed between the upper substrate 110 and the lower substrate 120 to define an accommodating space S. The intermediate alignment layer 134 and the liquid crystal material 140 are disposed in the accommodating space S. The transparent conductive layer 160 is disposed between the upper substrate 110 and the upper alignment layer 132. The transparent conductive layer 170 is disposed between the lower substrate 120 and the lower alignment layer 136.

With reference to FIG. 1B, in this embodiment, the upper alignment layer 132, the intermediate alignment layer 134, and the lower alignment layer 136 respectively have the orientation direction OD1, an orientation direction OD3, and an orientation direction OD2. The orientation direction OD1 and the orientation direction OD2 are perpendicular to each other. The orientation direction OD3 is between the orientation direction OD1 and the orientation direction OD2 and is, for example, a vector direction of the orientation direction OD1 and the orientation direction OD2, but is not limited thereto.

From another perspective, if the orientation direction OD2 of the lower alignment layer 132 acts as the base is set at 0 degree, the orientation direction OD1 of the upper alignment layer 132 is set at 90 degrees, and the orientation direction OD3 of the intermediate alignment layer 134 is set at a degree between 0 degree and 90 degrees, for example, set at 45 degrees.

Figure 4:
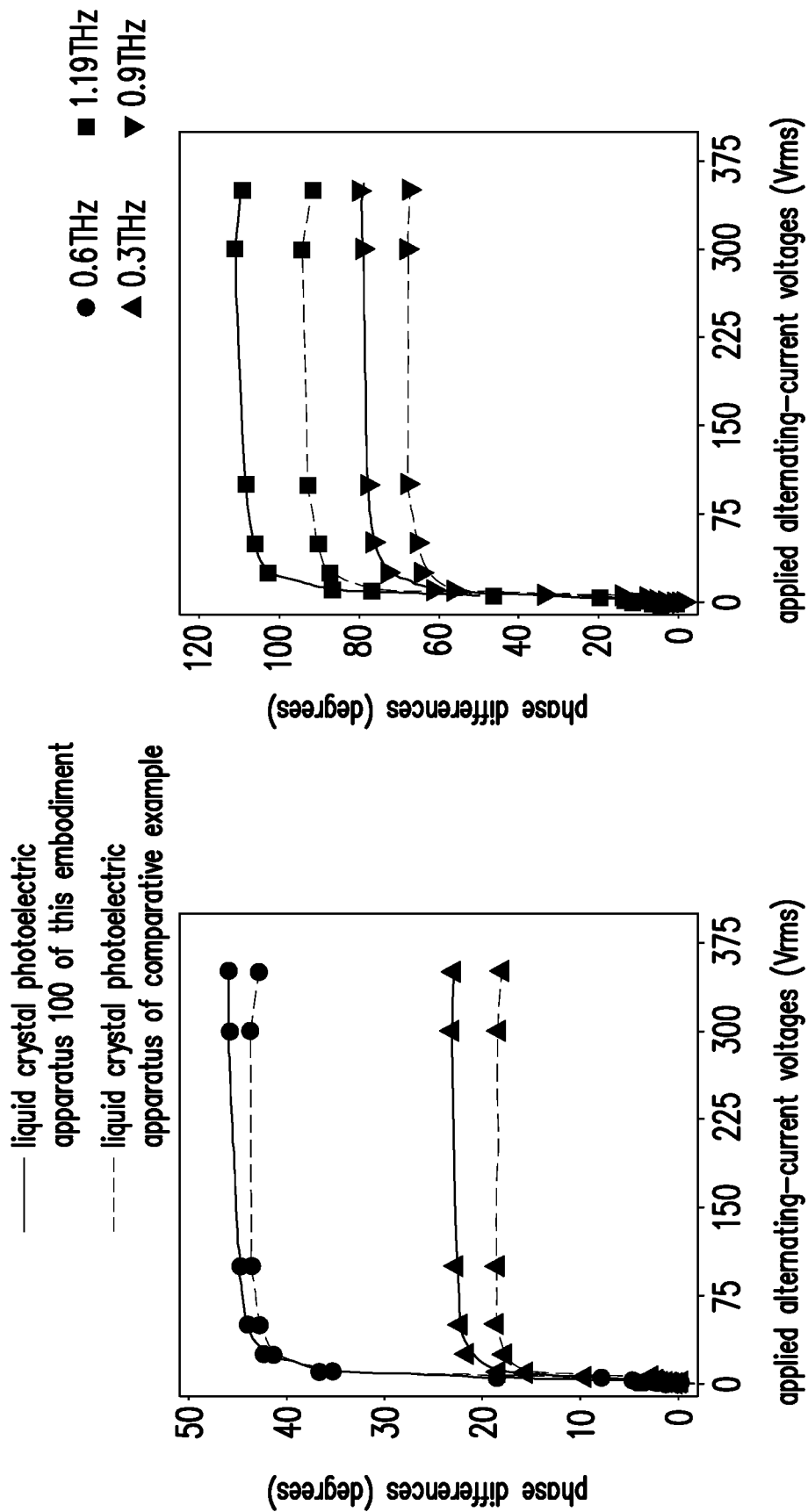
FIG. 4 are diagrams of relationships between applied voltages and phase differences of the liquid crystal photoelectric apparatus in FIG. 1A and FIG. 1B and a liquid crystal photoelectric apparatus in a comparative example.
Figure 5:
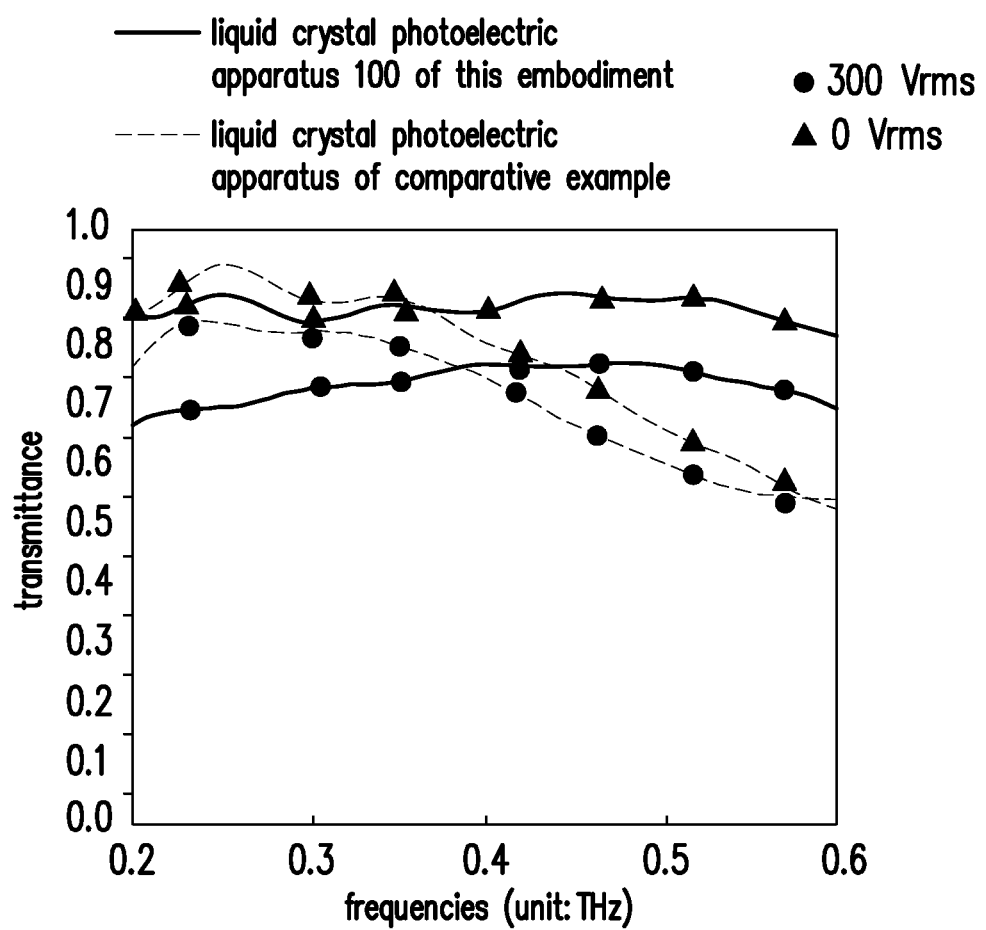
FIG. 5 is a diagram of transmittance correspondingly detected under light beams with different frequencies of the liquid crystal photoelectric apparatus in FIG. 1A and FIG. 1B and the liquid crystal photoelectric apparatus in the comparative example.

FIG. 4 are diagrams of relationships between applied voltages and phase differences of the liquid crystal photoelectric apparatus in FIG. 1A and FIG. 1B and a liquid crystal photoelectric apparatus in a comparative example. FIG. 5 is a diagram of transmittance correspondingly detected under light beams with different frequencies of the liquid crystal photoelectric apparatus in FIG. 1A and FIG. 1B and the liquid crystal photoelectric apparatus in the comparative example. The liquid crystal photoelectric apparatus of the comparative example is substantially similar to the liquid crystal photoelectric apparatus 100 of FIG. 1A, and a difference therebetween is that the intermediate alignment layer 134 is not disposed in the liquid crystal photoelectric apparatus of the comparative example, so that the liquid crystal material of the liquid crystal photoelectric apparatus of the comparative example is uninterruptedly distributed in the liquid crystal photoelectric apparatus.

With reference to FIG. 4, the horizontal axes are the root mean square values of applied alternating-current voltages, and the vertical axes are the phase differences between light beams passing through the liquid crystal photoelectric apparatus and the light beams before passing through the liquid crystal photoelectric apparatus. The solid lines and the dotted lines respectively represent the liquid crystal photoelectric apparatus 100 of this embodiment and the liquid crystal photoelectric apparatus of the comparative example. It can be seen from FIG. 4 that if an alternating-current voltage with a fixed root mean square value is applied to the liquid crystal photoelectric apparatus 100 and the liquid crystal photoelectric apparatus of the comparative example, and when light beams with different frequencies (0.3 THz, 0.6 THz, 0.9 THz, and 1.19 THz) are allowed to pass through the liquid crystal photoelectric apparatus 100 and the liquid crystal photoelectric apparatus of the comparative example, the phase differences generated by the liquid crystal photoelectric apparatus 100 in this embodiment are greater than that generated by the liquid crystal photoelectric apparatus of the comparative example. Further, in an interval between lower applied voltages (taking 0V to 75V for example), sensitivity (phase difference change/voltage change) between the phase difference and the voltage of the liquid crystal photoelectric apparatus 100 of this embodiment is greater. That is, as long as a low voltage is applied, the liquid crystal photoelectric apparatus 100 of this embodiment may generate a greater phase difference compared to the liquid crystal photoelectric apparatus of the comparative example.

With reference to FIG. 5, the horizontal axis is frequencies of the light beams, and the vertical axis is the transmittance. The solid lines and the dotted lines respectively represent the liquid crystal photoelectric apparatus 100 of this embodiment and the liquid crystal photoelectric apparatus of the comparative example. It can be seen from FIG. 5 that if alternating-current voltages of the same root mean square value (taking 300 Vrms and 0Vrms for example) are applied, measured transmittance of the liquid crystal photoelectric apparatus 100 of this embodiment under the light beam in 0.2 THz to 0.6 THz is more consistent (i.e., transmittance represented by a single solid line changes only slightly along the vertical axis). In contrast, the transmittance of the comparative example drops sharply at the frequencies greater than 0.4 THz (i.e., when the frequencies represented by a single dotted line along the horizontal axis is greater than 0.4 THz, transmittance represented by the vertical axis drops sharply).

Next, if alternating-current voltages of different root mean square values are applied to the liquid crystal photoelectric apparatus 100 of this embodiment, it can be seen that changes in transmittance under the light beams of 0.2 THz to 0.6 THz are more consistent (i.e., changes in transmittance between two solid lines are more consistent). In contrast, in the comparative example, transmittance changes in lower terahertz bands are greater compared to the transmittance changes in greater terahertz bands (i.e., transmittance changes between two dotted lines is greater in lower terahertz bands and is lower in greater terahertz bands). Hence, the comparative example is less applicable to the light beams in greater terahertz bands. In other words, the liquid crystal photoelectric apparatus 100 of this embodiment may feature more stable optical characteristics in different terahertz bands and may be applied to light beams in different terahertz bands.

With reference to Table 1 below, Table 1 records related data of the liquid crystal photoelectric apparatus 100 of this embodiment and the liquid crystal photoelectric apparatus of the comparative example. The rising time is defined as the time required by a phase change of an incident light beam from 10% of a maximum value to 90% of the maximum value supplied by the liquid crystal photoelectric apparatus 100. The falling time is defined as the time required by a phase change of the incident light beam from 90% of the maximum value to 10% of the maximum value supplied by the liquid crystal photoelectric apparatus 100.

TABLE 1

|  | rising time | falling time | threshold voltage | driving voltage |
|---|---|---|---|---|
| comparative example | 976 milliseconds | >100 seconds | 2.2 $V_{rms}$ | 10 $V_{rms}$ |
| liquid crystal photoelectric apparatus 100 of this embodiment | 424 milliseconds | 40 seconds | 1 $V_{rms}$ | 4 $V_{rms}$ |

It can be seen from Table 1 that the rising time, falling time, threshold voltage, and driving voltage of the liquid crystal photoelectric apparatus 100 of this embodiment all drop evidently compared to that of the comparative example, and thus the liquid crystal photoelectric apparatus 100 of this embodiment features favorable photoelectric properties.

In the liquid crystal photoelectric apparatus 100 of this embodiment, each of the liquid crystal material portion 142 and the liquid crystal material portion 144 of the liquid crystal material 140 is disposed between any adjacent two alignment layers 130. In other words, the alignment layers 130 divide the liquid crystal material 140 into the multiple liquid crystal material portion 142 and the liquid crystal material portion 144 and separate the liquid crystal material portion 142 and the liquid crystal material portion 144 apart. Hence, arrangement directions of the liquid crystal molecules close to the alignment layers 130 are determined by the orientation directions of the corresponding alignment layers 130, so that the liquid crystal molecules are disposed in a more orderly arrangement manner. In the liquid crystal photoelectric apparatus 100, an excessively great electric field (voltage) is not required to enable the liquid crystal molecules to be orderly arranged. In the liquid crystal photoelectric apparatus 100 of this embodiment, the problem of disorder arrangement of the liquid crystal molecules in the related is thereby prevented, and the liquid crystal photoelectric apparatus 100 may also feature fast response time (rising time and falling time), a thinner thickness, and favorable photoelectric properties in a terahertz band spectrum.

It should be explained that a part of the contents in the previous embodiments are used in the following embodiments, in which repeated description of the same technical contents is omitted, and elements which are named identically may be referred the part of the contents. A detailed description will not be repeated in the following embodiments.

Figure 6A:
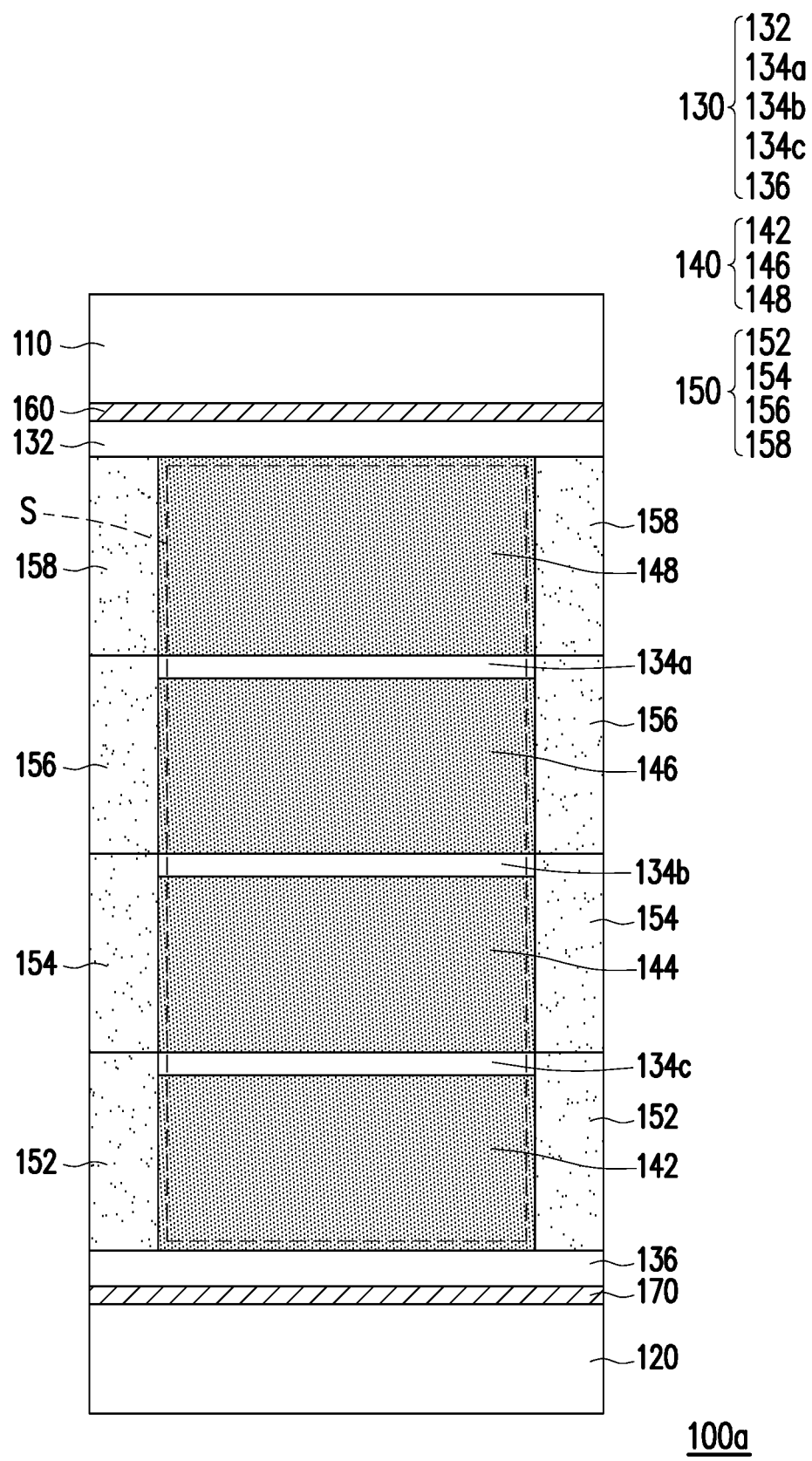
FIG. 6A is a schematic cross-sectional view of a liquid crystal photoelectric apparatus according to another embodiment of the invention.
Figure 6B:
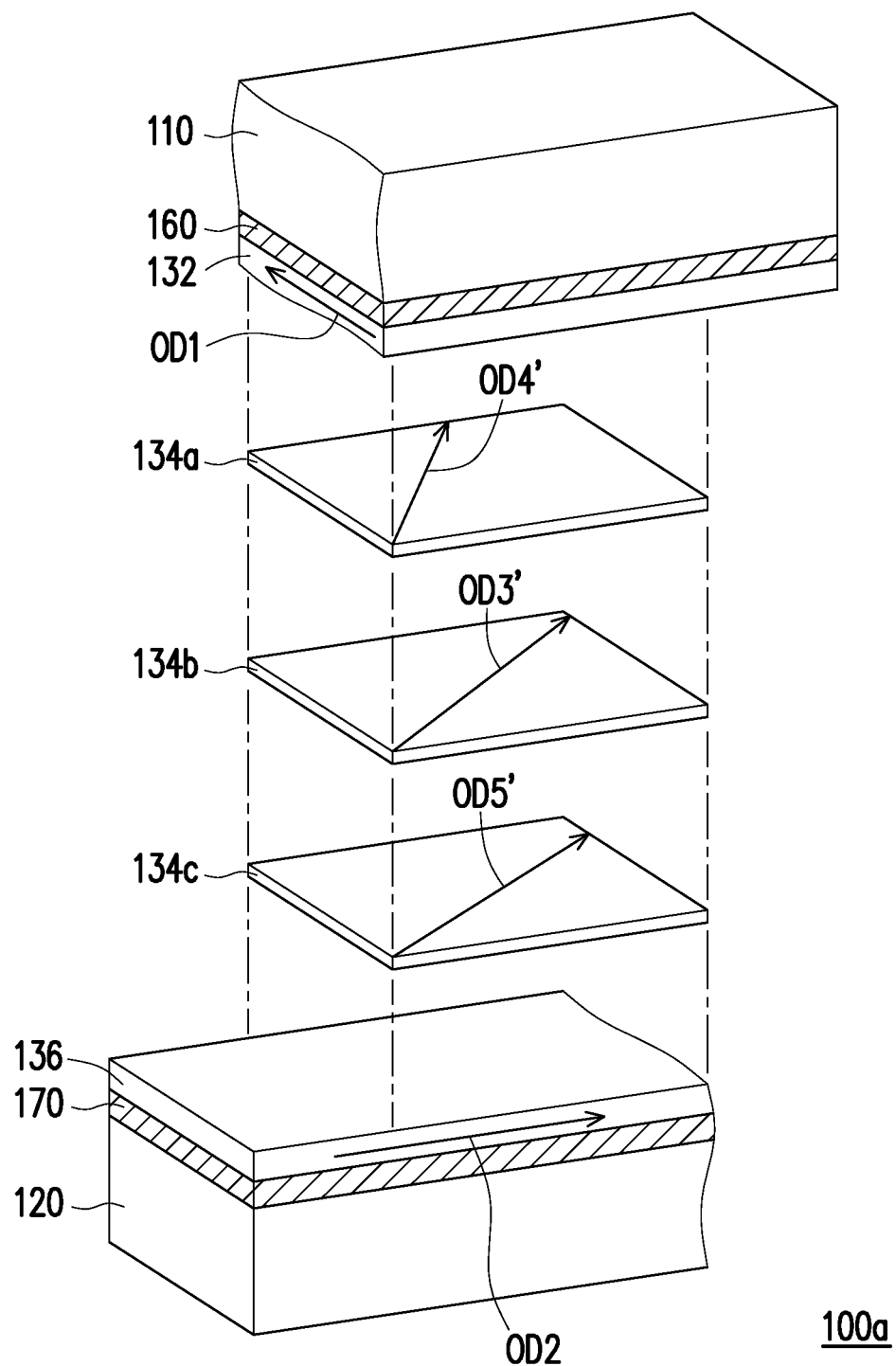
FIG. 6B is a schematic exploded oblique view of FIG. 6A according to an embodiment of the invention.

FIG. 6A is a schematic cross-sectional view of a liquid crystal photoelectric apparatus according to another embodiment of the invention. FIG. 6B is a schematic exploded oblique view of FIG. 6A according to an embodiment of the invention. For clarity, a spacer, a portion of an upper substrate, a portion of a lower substrate, and a portion of a transparent conductive layer are omitted in FIG. 6B.

With reference to FIG. 6A and FIG. 6B, a liquid crystal photoelectric apparatus 100a is substantially similar to the liquid crystal photoelectric apparatus 100, and a difference therebetween is that the number of the at least one intermediate alignment layer 134 in the liquid crystal photoelectric apparatus 100a is plural. For instance, three intermediate alignment layers 134a, 134b, and 134c are provided. The intermediate alignment layer 134a is disposed between the upper alignment layer 132 and the intermediate alignment layer 134b. The intermediate alignment layer 134b is disposed between the intermediate alignment layer 134a and the intermediate alignment layer 134c. The intermediate alignment layer 134c is disposed between the intermediate alignment layer 134a and the lower alignment layer 136. Intermediate orientation directions of the three intermediate alignment layers 134a to 134c respectively are OD4', OD3', and OD5'.

If the orientation direction OD2 of the lower alignment layer 136 acts as the base is set at 0 degree, the orientation direction OD1 of the upper alignment layer 132 is set at 90 degrees, and the orientation direction OD4' of the intermediate alignment layer 134a is set at, for example, 67.5 degrees. The orientation direction OD3' of the intermediate alignment layer 134b is set at, for example 45 degrees, and the orientation direction OD5' of the intermediate alignment layer 134b is set at, for example, 22.5 degrees. The number of the intermediate alignment layers and angles of the orientation directions described above are merely exemplary, and people having ordinary skill in the art may make adjustments according to needs.

FIG. 7A to FIG. 7H are process flow diagrams of part of a manufacturing method of manufacturing the liquid crystal photoelectric apparatus 100a of FIG. 6A and FIG. 6B.

The manufacturing method used to manufacture the liquid crystal photoelectric apparatus 100a of FIG. 6A is substantially similar to the manufacturing method used to manufacture the liquid crystal photoelectric apparatus 100, and a difference therebetween is that the plural intermediate alignment layers 134a to 134c are required to be manufactured. With reference to FIG. 2C, the steps of FIG. 2D to FIG. 2F are performed for several times first, so as to separately form the intermediate alignment layers 134a to 134c.

Figure 7A:
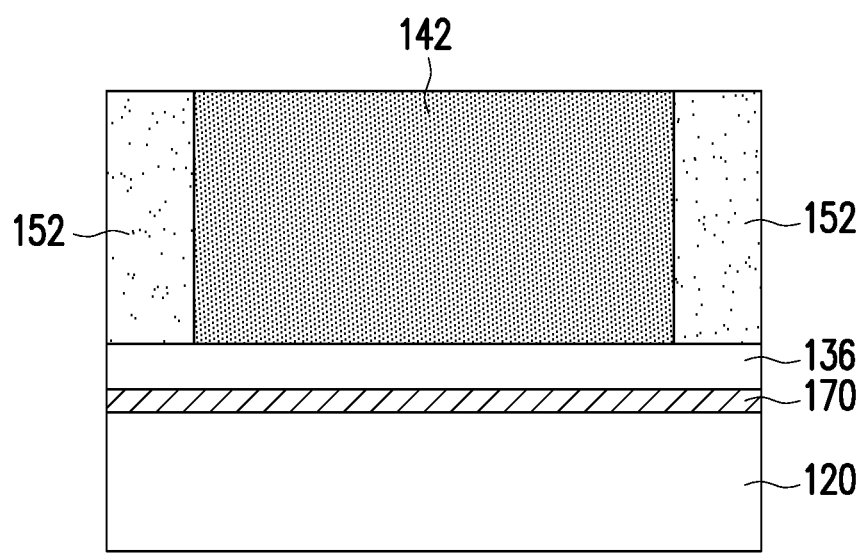
FIG. 7A to FIG. 7H are process flow diagrams of part of a manufacturing method of manufacturing the liquid crystal photoelectric apparatus of FIG. 6A and FIG. 6B.

With reference to FIG. 7A, the spacing portion 152 of the spacer 150 is provided to be disposed on the lower alignment layer 136, and the liquid crystal material portion 142 of the liquid crystal material 140 is disposed between the spacing portion 152 and the lower alignment layer 136.

Figure 7B:
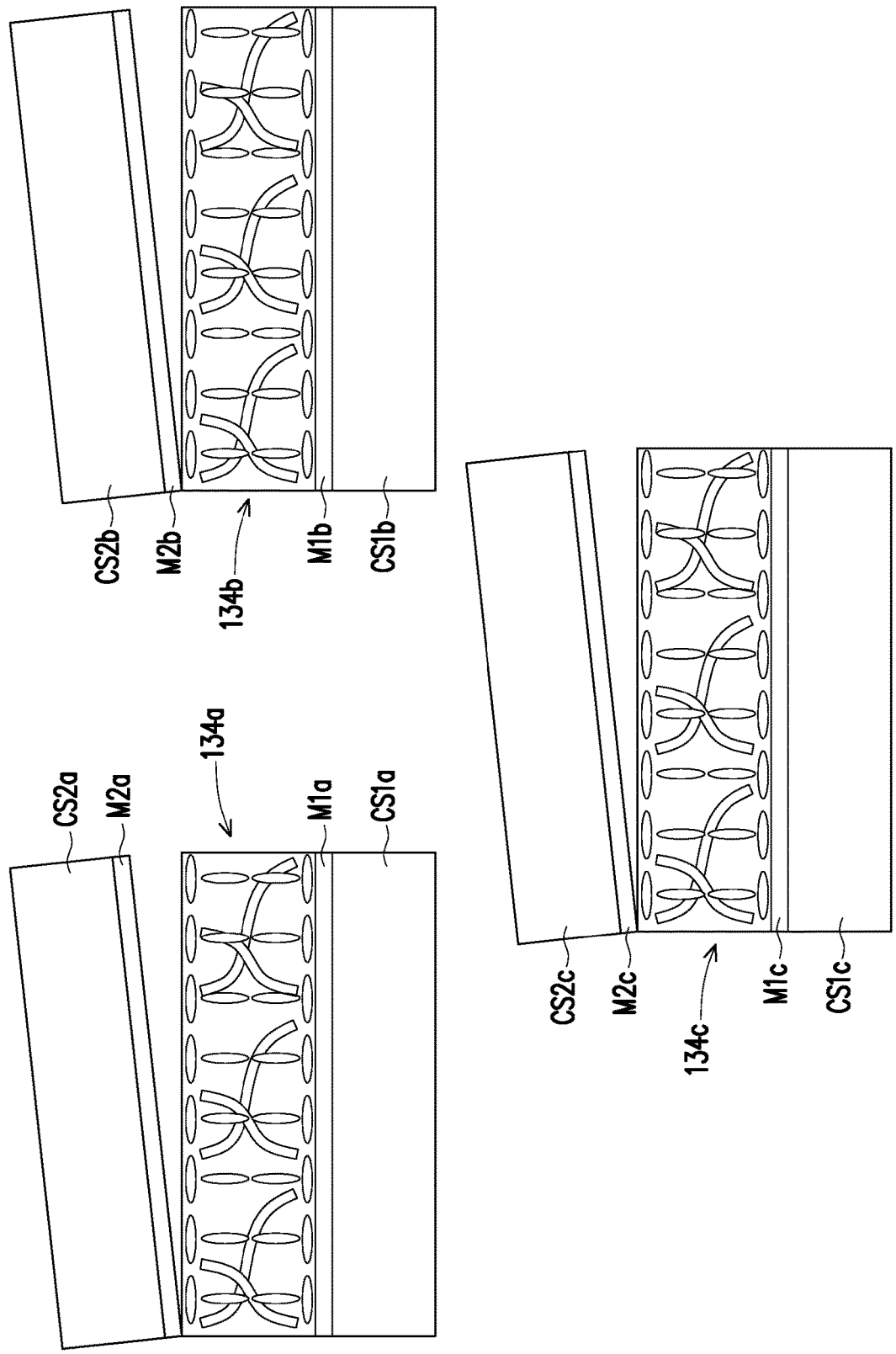

With reference to FIG. 7B, an alignment layer M2c and a transfer substrate CS2c, an alignment layer M2b and a transfer substrate CS2b, and an alignment layer M2a and a transfer substrate CS2a are peeled off through the heating process.

Figure 7C:
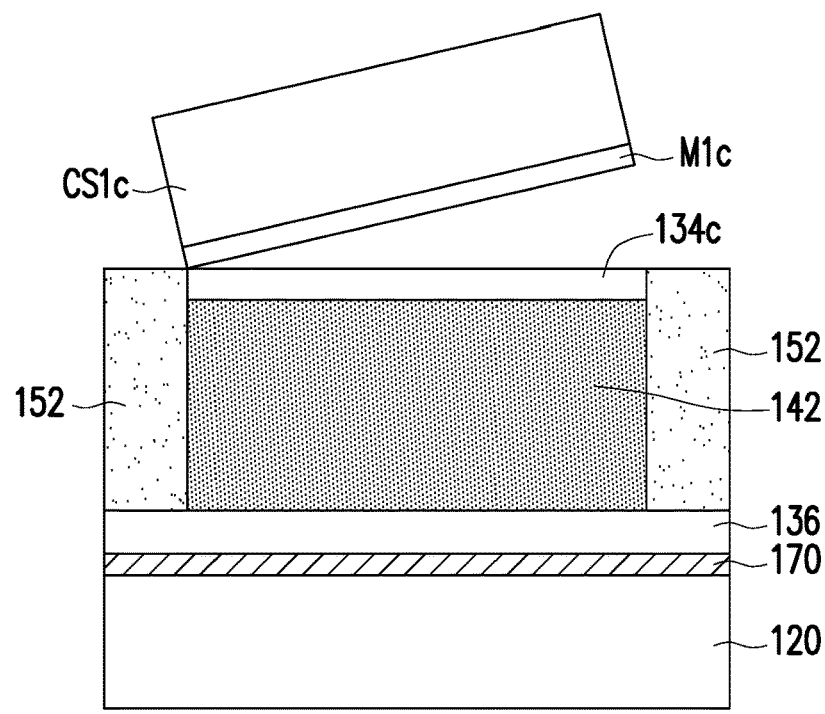
Figure 7D:
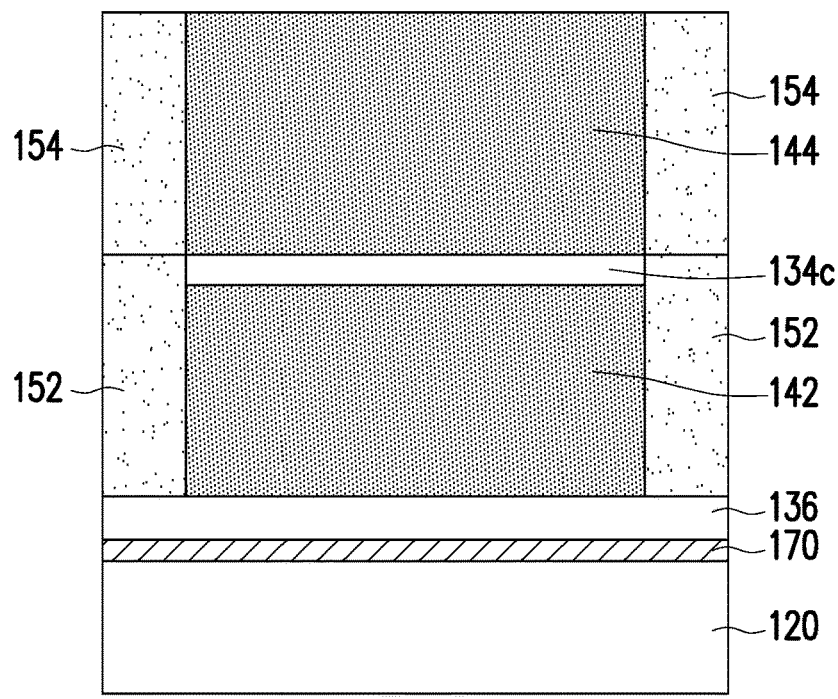
Figure 7E:
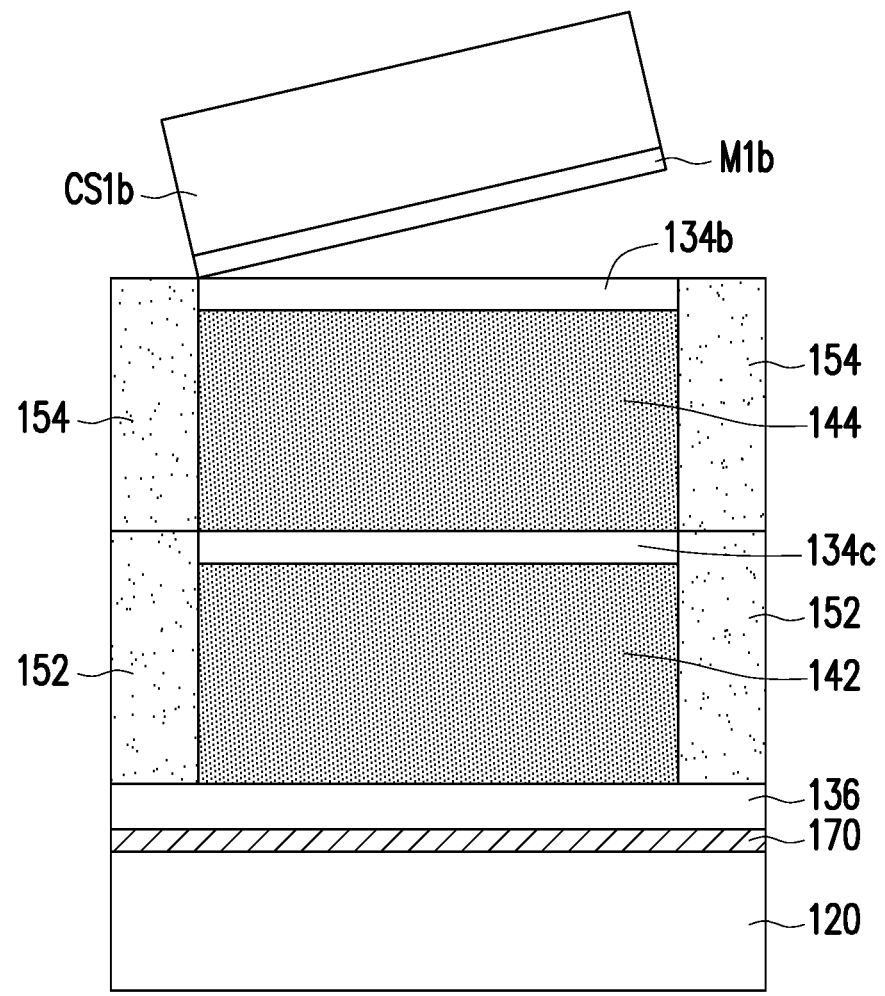
Figure 7F:
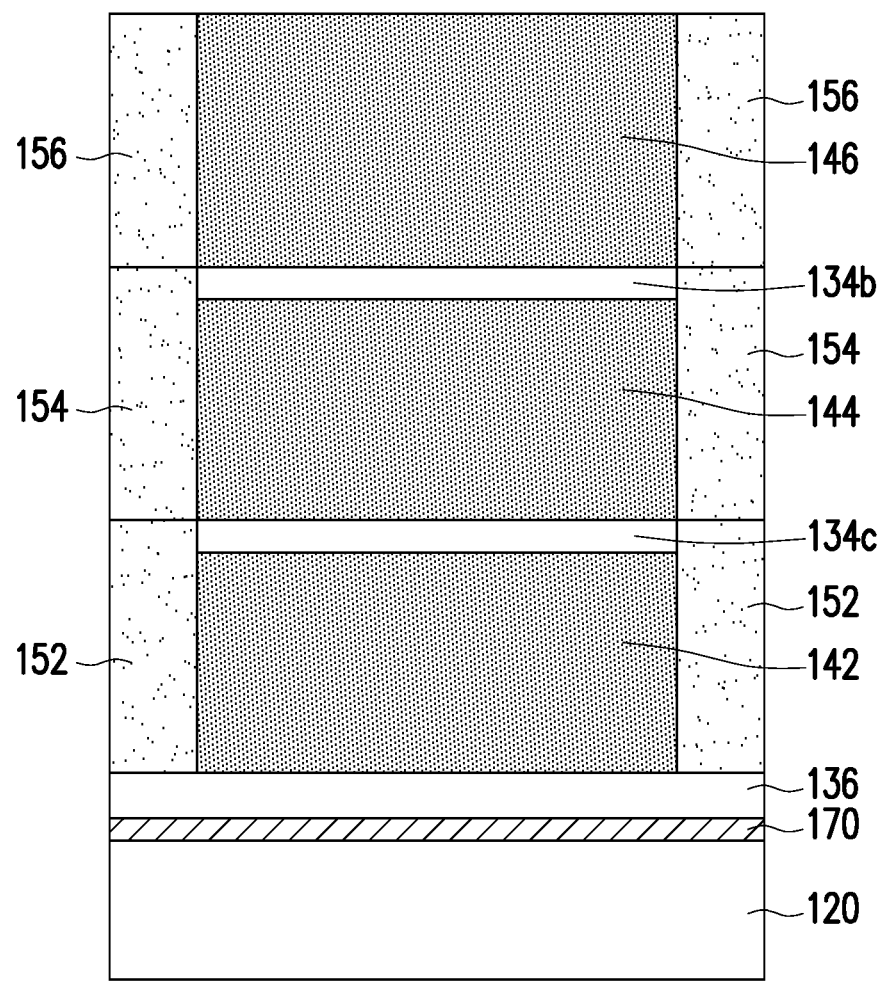
Figure 7G:
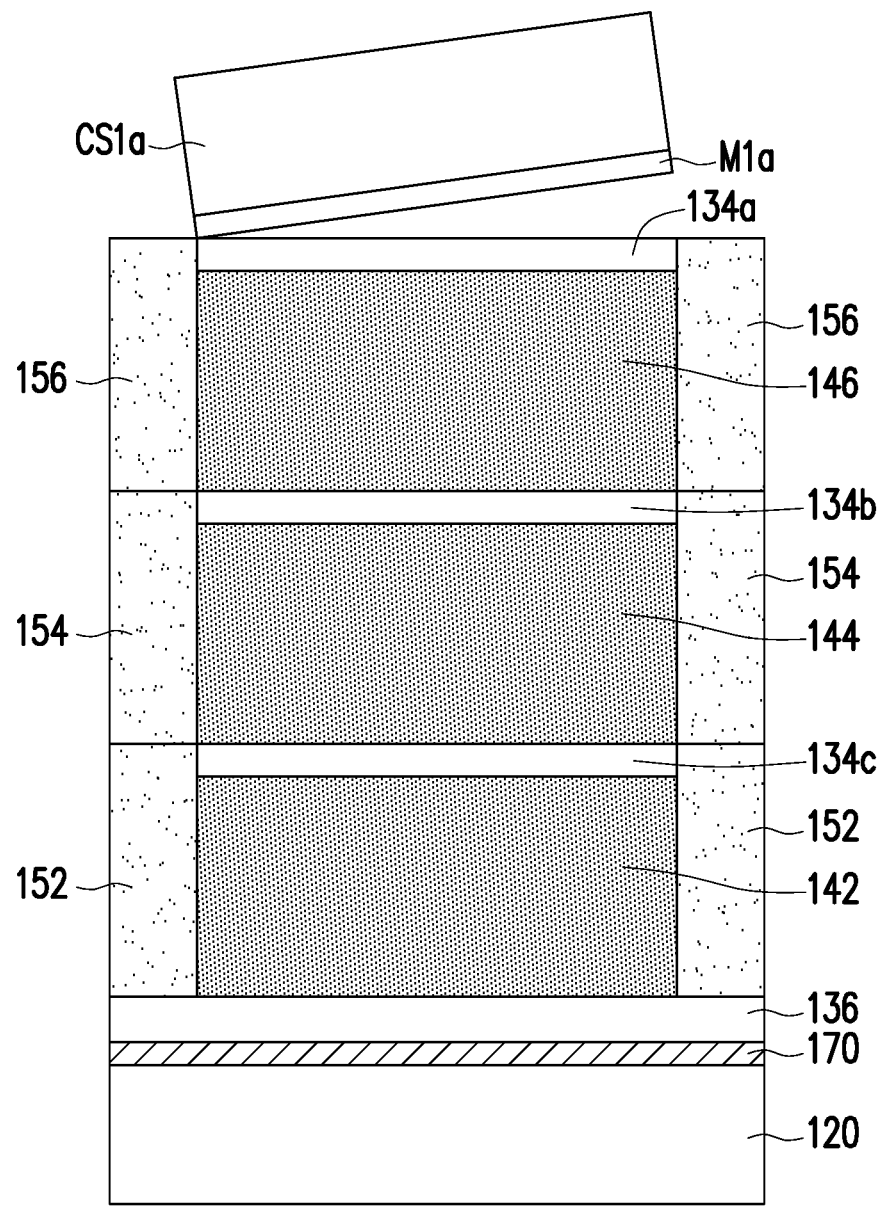

With reference to FIG. 7C, the transfer substrate CS1c is placed upside down on the liquid crystal material portion 142, so that the intermediate alignment layer 134c is disposed on the liquid crystal material portion 142. At the same time, the alignment layer M1c and the transfer substrate CS1c are peeled off through the heating process.

Next, with reference to FIG. 7D to FIG. 7G, the steps similar to the steps of FIG. 7A to FIG. 7C are performed.

The spacing portion 154 and the liquid crystal material portion 144 are disposed in sequence, the intermediate alignment layer 134b is transposed, the alignment layer M1b and the transfer substrate CS1b are peeled off, the spacing portion 156 is disposed, the liquid crystal material portion 146 is disposed, the intermediate alignment layer 134a is transposed, the alignment layer M1a and the transfer substrate CS1a are peeled off, the spacing portion 158 is disposed, and the liquid crystal material portion 148 is disposed.

Figure 7H:
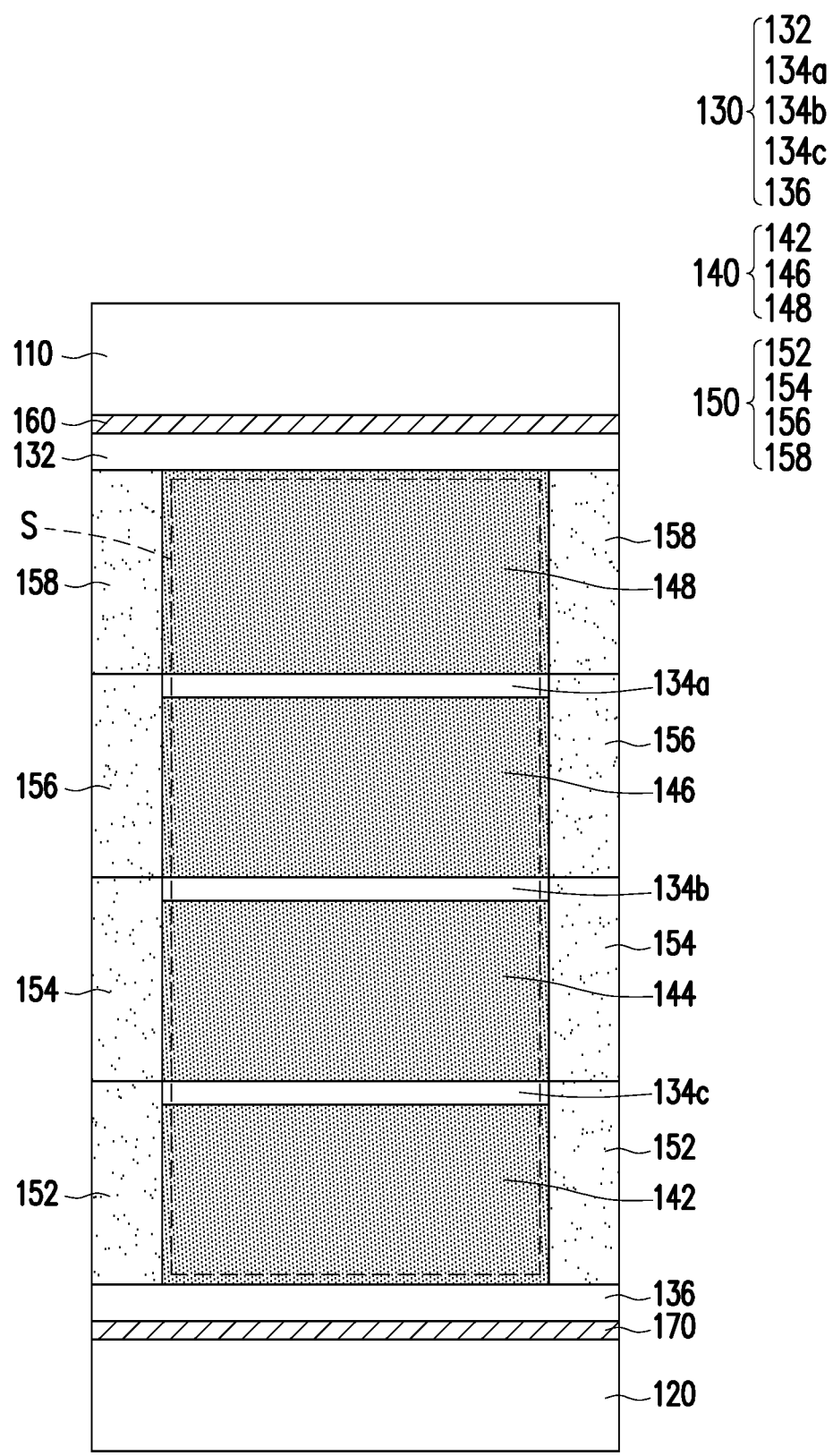

With reference to FIG. 7H, the upper substrate 110 on which the upper alignment layer 132 is formed is transposed onto the liquid crystal material portion 148, so that the intermediate alignment layers 134a to 134c are disposed between the upper alignment layer 132 and the lower alignment layer 136. Each of the liquid crystal material portions 142, 144, 146, and 148 of the liquid crystal material 140 is disposed between any adjacent two alignment layers 130. So far, manufacturing of the liquid crystal photoelectric apparatus 100a is substantially completed.

In this embodiment, the number of the intermediate alignment layers 134 is exemplified as three, and the number may be two or more than three is other embodiments and is not limited in this regard.

In the embodiments of the invention, the liquid crystal photoelectric apparatus 100 and the liquid crystal photoelectric apparatus 100a may be applied to a phase shifter in the terahertz band, a spatial light modulator, a notch filter, or other similar apparatuses. The invention is not intended to limit application fields of the liquid crystal photoelectric apparatus 100 and the liquid crystal photoelectric apparatus 100a.

In view of the foregoing, in the liquid crystal photoelectric apparatus and the manufacturing method thereof, since the intermediate alignment layer is disposed, and the orientation directions of the upper alignment layer, the lower alignment layer, and the intermediate alignment layer are correspondingly designed, the liquid crystal molecules of the liquid crystal material located between any two adjacent alignment layers are arranged in a more orderly manner. Therefore, the liquid crystal photoelectric apparatus features favorable photoelectric properties with the reduced thickness and may be applied to light beams in different terahertz bands.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A manufacturing method of a liquid crystal photoelectric apparatus, comprising:
   preparing an upper substrate and a lower substrate;
   forming a plurality of alignment layers, the alignment layers comprising an upper alignment layer, at least one intermediate alignment layer, and a lower alignment layer, wherein the upper alignment layer and the lower alignment layer are respectively formed on the upper substrate and the lower substrate, and the at least one intermediate alignment layer being disposed between the upper alignment layer and the lower alignment layer,
   wherein the upper alignment layer has a first orientation direction, the at least one intermediate alignment layer has an intermediate orientation direction, the lower alignment layer has a second orientation direction, and the intermediate orientation direction is between the first orientation direction and the second orientation direction;
   providing a liquid crystal material, the liquid crystal material comprising a plurality of liquid crystal material portions, disposing each of the liquid crystal material portions between any adjacent two alignment layers;
   wherein in the step of forming the alignment layers, the method of forming the upper alignment layer and the lower alignment layer comprises:
      forming two polymer films separately on the upper substrate and the lower substrate; and
      performing a rubbing process on the two polymer films in a first rubbing direction and in a second rubbing direction different from the first rubbing direction to respectively form the upper alignment layer and the lower alignment layer,
      wherein the first rubbing direction determines the first orientation direction, and the second rubbing direction determines the second orientation direction;
   wherein the method of forming the at least one intermediate alignment layer comprises:
      preparing a first transfer substrate provided with a first alignment layer and a second transfer substrate provided with a second alignment layer, an orientation direction of the first alignment layer and an orientation direction of the second alignment layer being anti-parallel to each other;
      providing another liquid crystal material and a liquid polymer, mixing the another liquid crystal material and the liquid polymer between the first alignment layer and the second alignment layer to form a mixture;
      performing a curing treatment on the mixture to form the at least one intermediate alignment layer between the first alignment layer and the second alignment layer, wherein the intermediate orientation direction of the at least one intermediate alignment layer is determined by the orientation direction of the first alignment layer and the orientation direction of the second alignment layer; and
      peeling off the first alignment layer and the first transfer substrate and the second alignment layer and the second transfer substrate in sequence;
   providing a first spacing portion of a spacer to be disposed on the lower alignment layer, disposing a first liquid crystal material portion of the liquid crystal material between the first spacing portion and the lower alignment layer;
   transferring the at least one intermediate alignment layer so that the at least one intermediate alignment layer is disposed on the first liquid crystal material portion;
   providing a second spacing portion of the spacer to be disposed on the at least one intermediate alignment layer, disposing a second liquid crystal material portion of the liquid crystal material between the second spacing portion and the at least one intermediate alignment layer; and
   transposing the upper substrate on which the upper alignment layer is formed onto the second liquid crystal material portion so that the at least one intermediate alignment layer is disposed between the upper alignment layer and the lower alignment layer.

2. The manufacturing method of the liquid crystal photoelectric apparatus as claimed in claim 1, wherein the curing treatment is an ultraviolet irradiation treatment.

3. The manufacturing method of the liquid crystal photoelectric apparatus as claimed in claim 1, wherein a voltage is simultaneously applied to the mixture when the curing treatment is performed on the mixture.

4. The manufacturing method of the liquid crystal photoelectric apparatus as claimed in claim 1, wherein the step prior to the step of forming the alignment layers further comprises:
respectively forming a first transparent conductive layer and a second transparent conductive layer on the upper substrate and the lower substrate.

5. The manufacturing method of the liquid crystal photoelectric apparatus as claimed in claim 1, wherein the first orientation direction and the second orientation direction are perpendicular to each other.

6. A manufacturing method of a liquid crystal photoelectric apparatus, comprising:
preparing an upper substrate and a lower substrate;
forming a plurality of alignment layers, the alignment layers comprising an upper alignment layer, at least one intermediate alignment layer, and a lower alignment layer, wherein the upper alignment layer and the lower alignment layer are respectively formed on the upper substrate and the lower substrate, and the at least one intermediate alignment layer being disposed between the upper alignment layer and the lower alignment layer,
wherein the upper alignment layer has a first orientation direction, the at least one intermediate alignment layer has an intermediate orientation direction, the lower alignment layer has a second orientation direction, and the intermediate orientation direction is between the first orientation direction and the second orientation direction;
providing a liquid crystal material, the liquid crystal material comprising a plurality of liquid crystal material portions, disposing each of the liquid crystal material portions between any adjacent two alignment layers;
wherein in the step of forming the alignment layers, the method of forming the upper alignment layer and the lower alignment layer comprises:
forming two polymer films separately on the upper substrate and the lower substrate; and
performing a rubbing process on the two polymer films in a first rubbing direction and in a second rubbing direction different from the first rubbing direction to respectively form the upper alignment layer and the lower alignment layer,
wherein the first rubbing direction determines the first orientation direction, and the second rubbing direction determines the second orientation direction;
wherein the method of forming the at least one intermediate alignment layer comprises:
preparing a first transfer substrate provided with a first alignment layer and a second transfer substrate provided with a second alignment layer, an orientation direction of the first alignment layer and an orientation direction of the second alignment layer being anti-parallel to each other;
providing another liquid crystal material and a liquid polymer, mixing the another liquid crystal material and the liquid polymer between the first alignment layer and the second alignment layer to form a mixture;
performing a curing treatment on the mixture to form the at least one intermediate alignment layer between the first alignment layer and the second alignment layer, wherein the intermediate orientation direction of the at least one intermediate alignment layer is determined by the orientation direction of the first alignment layer and the orientation direction of the second alignment layer; and
peeling off the first alignment layer and the first transfer substrate and the second alignment layer and the second transfer substrate in sequence;
wherein the number of the at least one intermediate alignment layer to be formed is plural, the intermediate alignment layers comprise a first intermediate alignment layer, a second intermediate alignment layer, and a third intermediate alignment layer, intermediate orientation directions of the first intermediate alignment layer, the second intermediate alignment layer, and the third intermediate alignment layer are different from one another, and the manufacturing method further comprises:
providing a first spacing portion of a spacer to be disposed on the lower alignment layer, disposing a first liquid crystal material portion of the liquid crystal material between the first spacing portion and the lower alignment layer;
transferring the first intermediate alignment layer so that the first intermediate alignment layer is disposed on the first liquid crystal material portion;
providing a second spacing portion of the spacer to be disposed on the first intermediate alignment layer, disposing a second liquid crystal material portion of the liquid crystal material between the second spacing portion and the first intermediate alignment layer;
transferring the second intermediate alignment layer so that the second intermediate alignment layer is disposed on the second liquid crystal material portion;
providing a third spacing portion of the spacer to be disposed on the second intermediate alignment layer, disposing a third liquid crystal material portion of the liquid crystal material between the third spacing portion and the second intermediate alignment layer;
transferring the third intermediate alignment layer so that the third intermediate alignment layer is disposed on the third liquid crystal material portion;
providing a fourth spacing portion of the spacer to be disposed on the third intermediate alignment layer, disposing a fourth liquid crystal material portion of the liquid crystal material between the fourth spacing portion and the third intermediate alignment layer; and
transposing the upper substrate on which the upper alignment layer is formed onto the fourth liquid crystal material portion so that the first intermediate alignment layer, the second intermediate alignment layer, and the third intermediate alignment layer are disposed between the upper alignment layer and the lower alignment layer.

* * * * *